April 27, 1937.   C. A. BENNETT   2,078,309

APPARATUS FOR DRYING SEED COTTON

Filed Nov. 6, 1936

INVENTOR
Charles Abel Bennett
ATTORNEYS

Patented Apr. 27, 1937

2,078,309

UNITED STATES PATENT OFFICE 2,078,309

APPARATUS FOR DRYING SEED COTTON

Charles Abel Bennett, Stoneville, Miss.; dedicated to the free use of the People of the United States Application November 6, 1936, Serial No. 109,505

2 Claims. (Cl. 19—74)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

I hereby dedicate the invention herein described to the free use of the Public in the territory of the United States of America to take effect upon the granting of a patent to me.

My invention relates to improvements in seed-cotton drying apparatus in which the now well known "Government process" for drying seed cotton, as developed by the U. S. Department of Agriculture, is applied. The "Government process" includes: (1) Treating damp seed cotton with a continuous current of from 40 to 100 cubic feet of hot air, per pound of cotton; (2) exposing cotton to the drying process for different periods, usually 15 seconds to 3 minutes; (3) the temperature of the heated air to be preferably between 150° and 160° F. In my invention a current of heated atmosphere from one source and a seed-cotton conveying current of cold air from another source are jointly drawn into an airline type of cleaner through a split-suction inlet device whereby the seed cotton becomes sufficiently agitated in the resulting hot mixture of the two air volumes comprising the drying medium and thus obtains a satisfactory degree of dryness in the cotton fiber for improved cleaning and ginning.

To avoid misunderstanding of terms herein employed, the following definitions and explanations are herewith given. An "airline" cleaner is one that operates on the suction side only of a seed-cotton handling system, wherein the suction currents assist beaters or cylinders in moving the material through the machine, and wherein the suction currents are the conveying medium from the discharge outlet of the machine to separators or pneumatic chutes, as the case may be. An airline cleaner must be substantially airtight in construction and acts as a virtual enlargement of the suction duct into which it is incorporated. The interior of an airline cleaner, therefore, during suction periods is subjected to a condition of partial vacuum to such an extent that it is significantly below atmospheric pressure, frequently as much as 10 to 20 inches of water on a U-tube water gauge. Unless the term "airline" is specifically employed with reference to cotton cleaning mechanisms, it has now become the established practice of the ginning industry to assume that said cotton cleaning mechanisms are of the "gravity" or out-of-suction type. A "gravity" cleaner may be any form of cleaner that discharges its cotton by gravity, is fed by separator or dropper or other means so that the seed cotton falls into the cleaner, and so that any suction imposed upon the body of the machine does not primarily assist in conveying the seed cotton through the apparatus. A "separator" is herein considered to be synonymous with an "air-seal dropper", and is customarily sealed mechanically either by revolving flaps on a partitioned cylinder, or by the flaps on a belt distributor passing beneath. A "pneumatic chute" is herein considered to be synonymous with a "pneumatic elevator" and is the means employed in pneumatic systems for supplying seed cotton to the feeders and ginning apparatus. The distinctive differences between mechanical and pneumatic systems of distributing seed cotton as herein referred to are officially set forth on page 42 of Farmers' Bulletin No. 1748, "Ginning Cotton", as issued in August, 1935, by the United States Department of Agriculture.

Prior to my invention certain driers for seed cotton have introduced the cotton only into so-called gravity-type cleaners by means of separators or droppers, after which additional volumes of heated atmosphere have been introduced into the cleaners; but such methods have not been applicable to airline cleaners, especially with such forms of ginning apparatus as the pneumatic elevator system. My invention adds no moving mechanisms of any kind to the ginning system and yet permits a drying process to be introduced in a very simple manner in existing gins with airline cleaners by providing an extra or split-suction connection to the piping at the inlet transition piece of the airline cleaner together with a speeding up of the suction fan sufficiently to handle the two suction currents thus created. It will be seen that my invention affords a simple and inexpensive form of drier for smaller gins having any form of airline cleaner, regardless of whether the cleaner is of the axial-flow, air-draft, cross-drum or serpentine type, and further regardless of whether the ginning system proper has the pneumatic or mechanical form of distribution.

The airline type of cleaner provides a special storage space for seed cotton that may be trapped in a pneumatic system during suction cut-off periods and it will be seen that my invention adapts itself perfectly to this condition of intermittent suction.

Prior to my invention the use of a cotton drying process in gins having pneumatic distribution has been difficult because the periodic cut-off of the fan suction not only prevented a continuous flow of cotton from the outlet of most forms of driers, but also necessitated expensive alterations to the ginning system by requiring extra fans, feeders or other apparatus.

It will be readily seen that my present invention differs broadly from that of Mr. B. O. Underwood, Patent 1,998,210, in that I apply a split suction in combination with the airline cleaner inlet and do not interpose a fan between the cotton suction and the drier, nor do I employ a fan other than the regular gin fan for drying.

It will be also readily seen that my invention differs broadly from that of Mr. John E. Mitchell, Patent 2,025,700, in that he not only employs separators or air-seal droppers in combination with only gravity-type cleaners, but that he also uses a special drying fan in connection therewith.

In my research work and investigations for the United States Department of Agriculture as a drying engineer and as the engineer for the U. S. Cotton Ginning Laboratory, I have discovered certain facts further bearing upon the drying of seed cotton, which specifically apply to my invention as follows:

First, that in most cotton gins the suction pipe to the wagon telescope may be advantageously reduced in size (to, for instance, approximately 10 inches in diameter as compared to present diameters of 12 or 13 inches); thus enabling the operator, on the one hand, to reduce the volume of conveying air drawn from the bins or wagon telescope, and, on the other hand, by speeding up the suction fan to employ a split suction for introducing the necessary additional volume of hot air concurrently into the airline cleaner, without imposing an excessive increase in power requirements.

Second, that the violent agitation of cotton while in the presence of the drying medium of hot air enables the drying process to be utilized in airline cleaners with a minimum period of exposure because of the partial vacuum created within the cleaner by the suction.

The objects, therefore, of my invention are—

First, to apply the Government process to the bulk drying of seed cotton in airline cleaners; second, to provide a drying system applicable to either continuous or intermittent operation, depending upon the type of ginning system without necessitating the use of an additional separator in any case; and third, to provide a simple and economical form of drier which requires little or no additional head room and may be readily installed in any existing cotton ginning establishment that is equipped with either axial-flow air-draft, serpentine, or cross-drum airline cleaners.

I attain these objects by the apparatus for drying seed cotton illustrated in the accompanying drawing, in which—

Similar numerals refer to similar parts throughout the several views.

Figure 1:
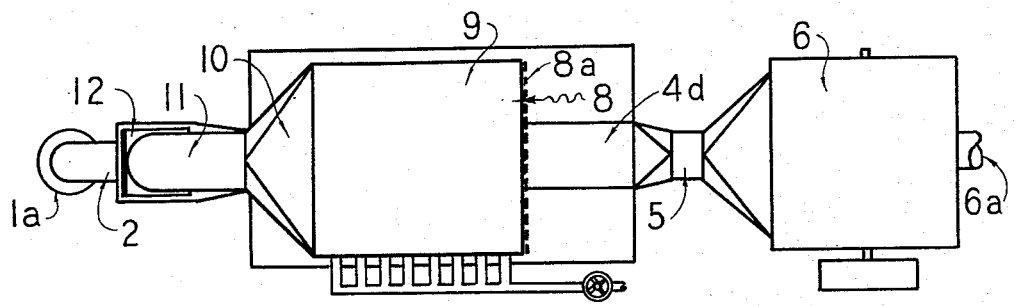
Figure 1 is a plan of the installation.

Referring to the drawing, it will be seen that my drier comprises the junction of the primary seed-cotton suction piping 1, 1a, and 2 of a mixing transition piece 3, with a secondary hot-blast piping system 11, having a damper control 12 and being connected by means of a transition piece 10 to a blast coil assembly 9 with an inlet 8; from which said mixing transition piece 3 both seed cotton and cold and hot air are by suction drawn concurrently into the inlet 4a of the airline cleaner 4, where the seed cotton is agitated or fluffed up by the beaters or cylinders 4b, and is thence drawn from the outlet 4c by the suction piping 5 into the mechanical separator 6, or pneumatic chute of the ginning system, which is represented by the bracketed assembly of all parts 7, which customarily comprise the distributor, feeders, and gin stands.

The mixing transition piece 3 is air-tight and preferably constructed of sheet metal so that the seed-cotton suction pipe 2, which should preferably be approximately 10 inches in diameter, may be introduced axially of and projects into the cylindrical portion 3a of the mixing transition piece 3 with adequate clearance for the unrestricted introduction of hot air from the piping system 11 under the control of the damper 12.

Figure 2:
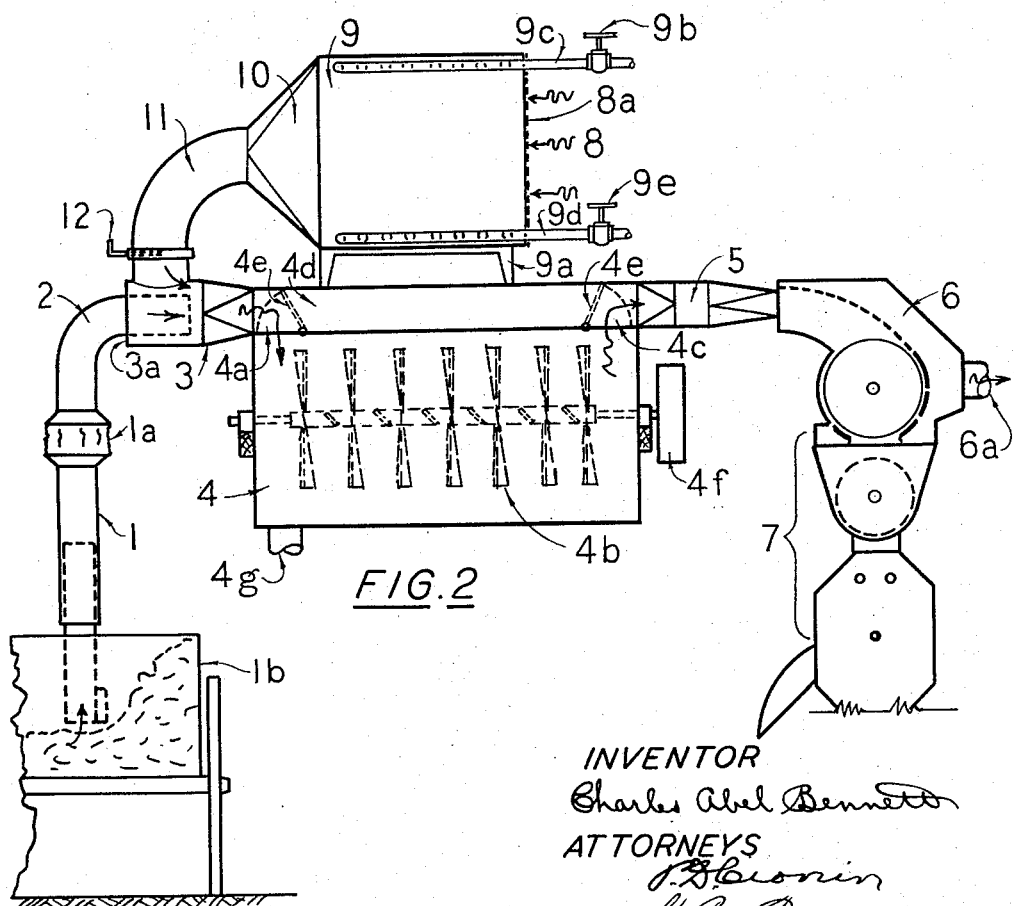
Figure 2 is a side elevation of the apparatus.

In Figure 2 I have indicated the by-pass 4d and the by-pass dampers 4e, which are now used on airline cleaners in hundreds of gins throughout the United States, but when the drying system is being employed, the dampers 4e are set so that the seed cotton and hot air must pass into the body of the airline cleaner 4. The cleaner 4 is operated from a source of motive power (not shown) that drives the beaters or cylinders 4b through pulley 4f. The trash discharge 4g from the cleaner may be sealed by any of several well-known methods (not shown). The blast coil or heater assembly 9 may be mounted as shown upon the airline cleaner by the supports 9a in a manner similar to that employed during the Government tests of the system, but if the blast coils are positioned above the water line of the steam boiler, it is unimportant as to the exact location of the heater assembly 9, because the same may be supported from the roof beams or placed upon an independent platform to suit the particular requirements of any ginning installation. The inlet 8 to the heater coils 9 is preferably screened by the wire mesh 8a so that any commercial form of steam radiation surface may be used without becoming haired over or choked by the accumulation of cotton fly and other foreign matter customarily found in the atmosphere of cotton gins.

Transition piece 10 and the hot air piping 11 should preferably be of sheet metal. I prefer that they be made in sizes of 14-inch diameter or larger piping for system 11. The damper 12 may be of either butterfly or slide-valve type, although the slide-valve type is here delineated, because it can be readily maintained in any position with minimum difficulty.

Control of the volume of heated atmosphere is achieved by the use of the damper 12, in combination with speed adjustments of the suction fan (not shown), and control of the temperature is primarily achieved by regulation of the valve 9b on the supply pipe 9c, which conveys hot fluid from a boiler (not shown) to the radiation elements (not shown) within the body of the heater assembly 9. Condensation or cold fluid from said heater assembly 9 is disposed of through the drain piping 9d and the valve 9e to a predetermined point (not shown). The suction force of air handled through the respective piping systems 2 and 11 is dependent upon the speed of the suction fan (not shown) which connects to the pneumatic or mechanical separator 6 at the point 6a.

It should be understood that variations in the position of the blast coils and in the method of constructing the mixing transition piece 3, together with the sizing of the piping systems 2 and 11, may be effected without departing from the spirit of my invention. Further, the use of either axial-flow, cross-drum, air-draft or serpentine types of airline cleaners in combination with either mechanical or pneumatic systems may be likewise effected without departing from the spirit of my invention, because all eight combinations of this ginning machinery apparatus are encountered in the Cotton Belt.

Referring to the operation of my drier and the application thereto of the Government drying process, it will be seen that the damp seed cotton and cold air are drawn by suction from bins (not shown) or from the wagon 1b into the telescope piping 1 and thence through the flexible bell or telescope point 1a and piping 2 into the mixing transition piece 3, and thence into the airline cleaner at inlet 4a, while simultaneously a second current of atmosphere is drawn through the screened inlet 8 into the blast heater assembly 9, where it is heated and passes through the transition piece 10 into the piping system 11, thence past the control damper 12 into the mixing transition piece 3 and on into the airline cleaner 4. In entering the airline cleaner 4, the volume of cold air that has accompanied the seed cotton is so intermingled with the volume of heated air from the blast coil assembly 9 that the resulting temperature of the mixture is brought up to approximately 150 or 160 degrees Fahrenheit, or even more, in which drying medium the cotton is thoroughly agitated by the beaters or cylinders 4b while passing through the airline cleaner 4. The beaters, in combination with the flow of the drying medium, cause the cotton to be discharged at the outlet of the airline cleaner 4c with the fiber in a dried condition. Both the dried cotton and warm air then pass through the suction piping system 5 into the mechanical or pneumatic separator 6, where the cotton is discharged to the ginning system 7, while the moisture-laden warm air is conveyed through the suction piping 6a to the suction fan (not shown).

By selecting the proper heating surface in the blast coil assembly 9, and by controlling the speed of the suction fan of the ginning system, my invention may thus be adapted to handling the damp cotton conditions at many of the smaller gins in the different sections of the cotton growing regions of the United States.

I am aware that prior to my invention various cotton driers have been made which employ the Government process in combination with cleaners and separators. I do not claim such a combination broadly, therefore, but

I claim:

1. A cotton drying apparatus comprising an airline cleaner, a cylindrical mixing chamber on the inlet side of and running into said cleaner, said mixing chamber having a lateral hot air inlet and a concentric cold air and cotton inlet, said cold air and cotton inlet being of smaller diameter than said mixing chamber and projecting into said mixing chamber, means for pneumatically conveying cotton through said cold air and cotton inlet, mixing chamber and airline cleaner, means for introducing heated air to said hot air inlet, means for agitating the cotton in the resulting mixture of heated and cold air; and means for the continuous passage of dried cotton and warm air from said cleaner to the mechanical separator of a seed-cotton handling system.

2. In a cotton drying apparatus having an airline cleaner, a cylindrical mixing chamber on the inlet side of and opening into said cleaner, said mixing chamber having a lateral hot air inlet and a concentric cold air and cotton inlet, the cold air and cotton inlet being of smaller diameter than the mixing chamber and projecting into said mixing chamber.

CHARLES ABEL BENNETT.